Jan. 15, 1935.  E. C. DUMAN  1,988,304
ATTACHED AUTOMOBILE JACK
Filed Sept. 17, 1934  3 Sheets-Sheet 1
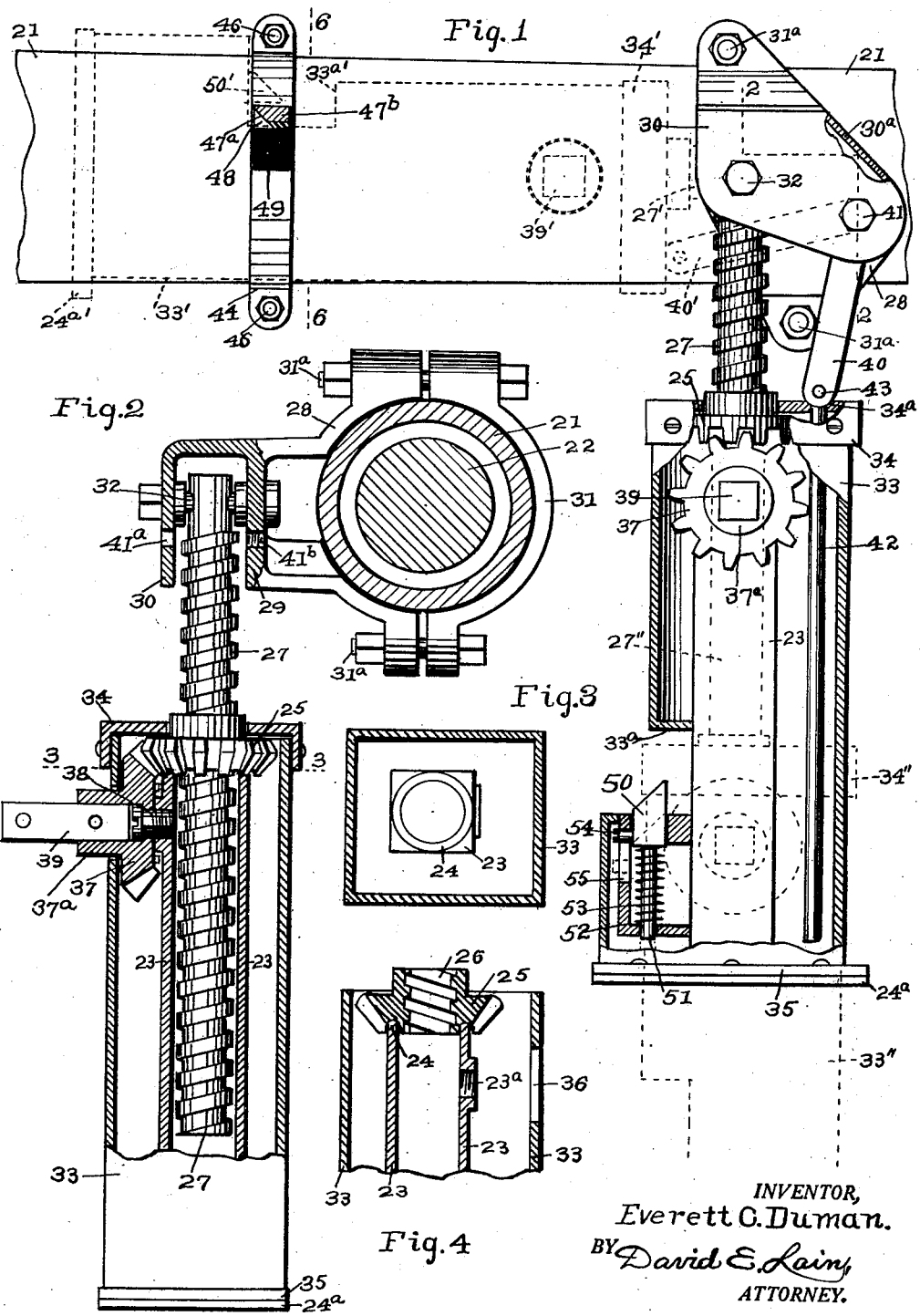
INVENTOR,
Everett C. Duman.
BY David E. Lain,
ATTORNEY.

Jan. 15, 1935.  E. C. DUMAN  1,988,304
ATTACHED AUTOMOBILE JACK
Filed Sept. 17, 1934   3 Sheets-Sheet 2
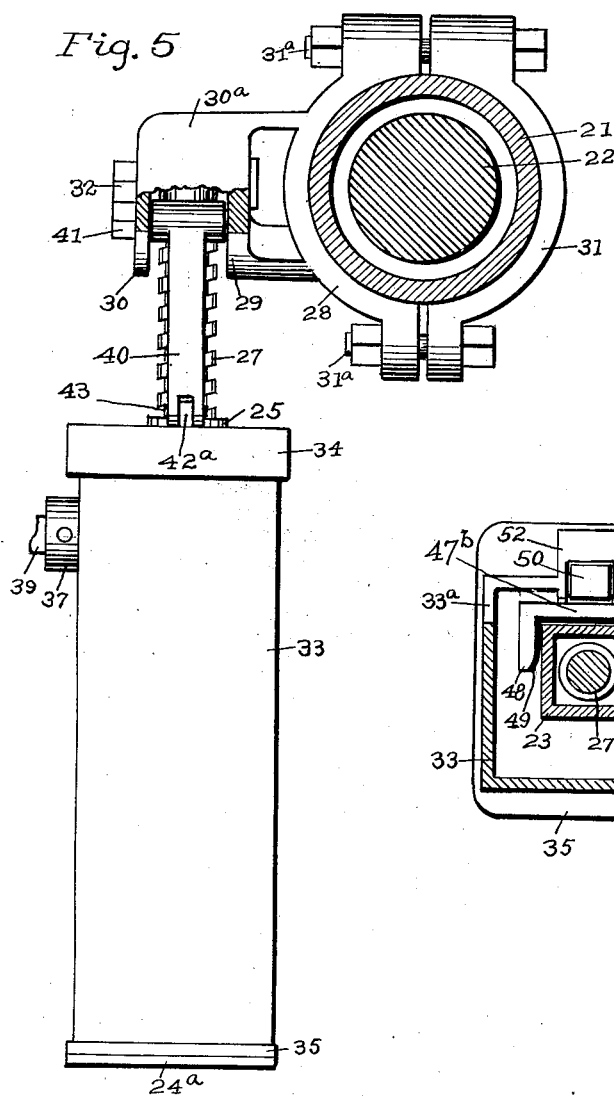
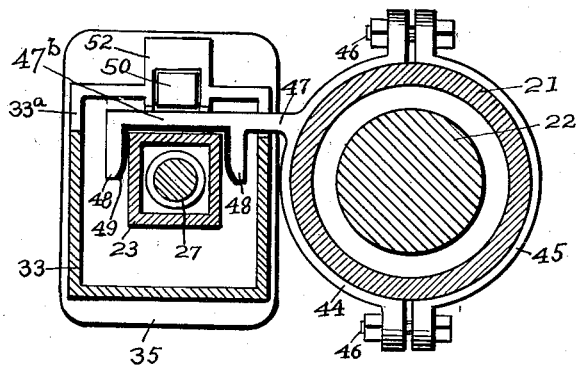
INVENTOR,
Everett C. Duman.
BY David E. Lain,
ATTORNEY.

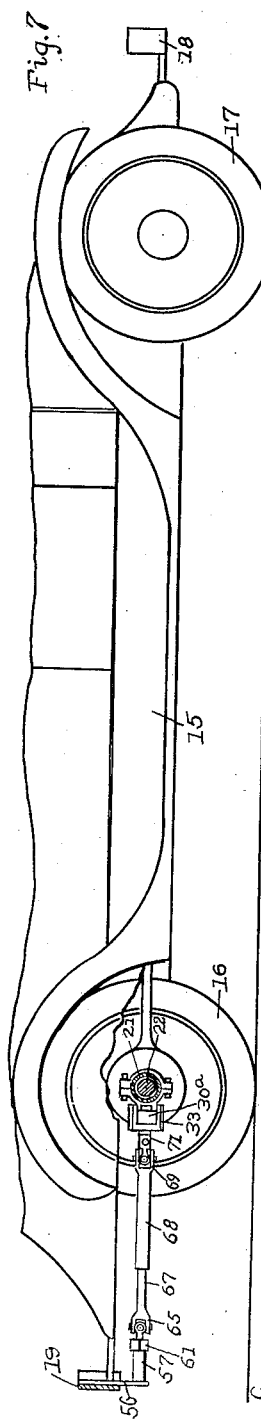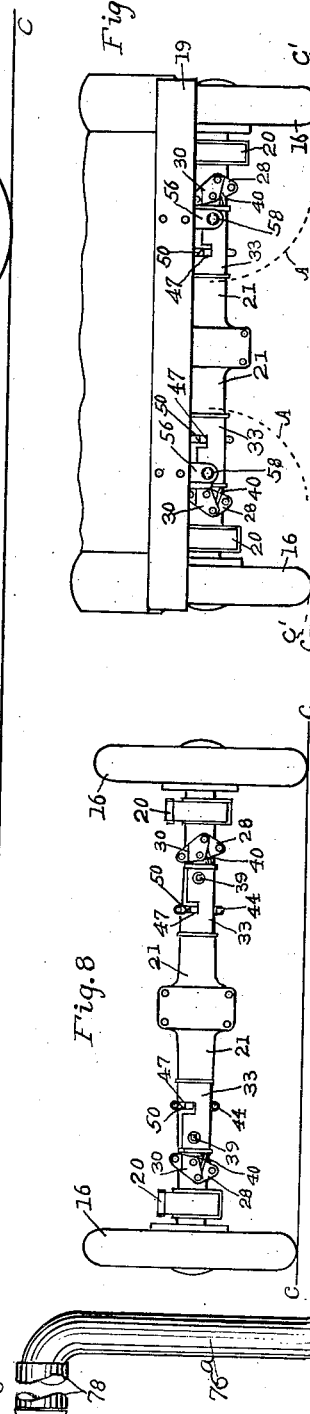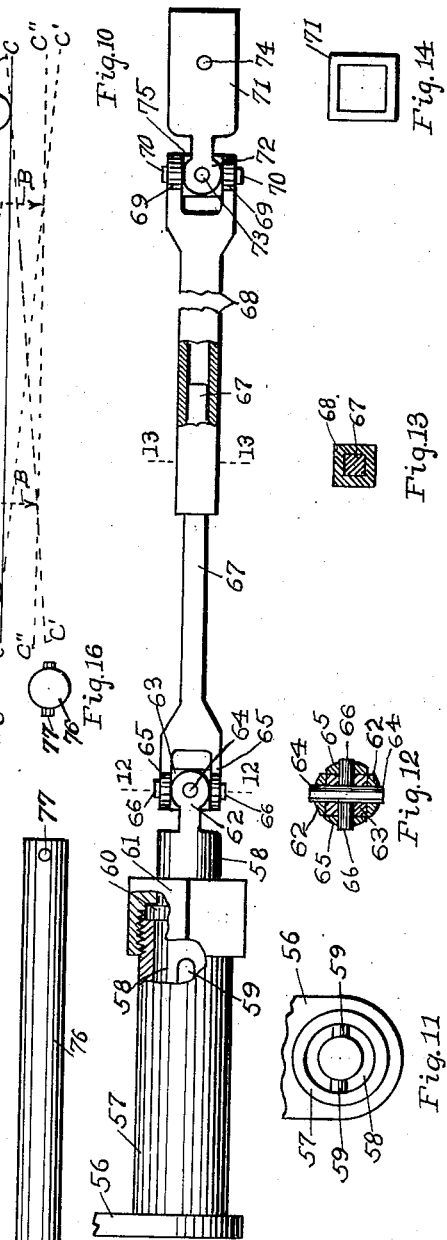

Patented Jan. 15, 1935

1,988,304

UNITED STATES PATENT OFFICE 1,988,304

ATTACHED AUTOMOBILE JACK

Everett C. Duman, Bellingham, Wash.

Application September 17, 1934, Serial No. 744,372

4 Claims. (Cl. 254—86)

My invention relates to improvements in attached automobile jacks, and has for an object to provide suitable jacks and means to attach the same to the axles of automobiles wherewith any one or all of the wheels of the automobiles may be raised clear from the ground by turning cranks removably engaged with the jacks and disposed at accessible external parts of the bodies of the automobiles.

Another object of my improvement is to provide means to connect a jack to an automobile axle suitably for vertical suspension therefrom and also for attachment thereto alongside thereof.

Another object of my improvement is to provide means for changing the relations of a jack to an automobile axle from that of dependence therefrom to that of parallelism therewith, and vice versa, by revolving the screw of the said jack.

Another object of my improvement is to provide operative connections between a jack attached to an automobile axle and an exterior part of the body of the automobile which are automatically adjustable to changing distances between the said axle and body.

Other objects of my improvement will appear as the description proceeds.

I attain these and other objects of my improvement with the mechanism illustrated in the accompanying three sheets of drawings, forming a part of this specification, in which Figure 1 is an elevation view of a fragmentary portion of the rear axle of an automobile and a jack depending therefrom shown in solid lines and also showing the jack fastened along side of the axle in dotted outline, Fig. 2 is an end elevation of Fig. 1 with parts broken away, Fig. 3 is a top plan view of Fig. 2 in section in the line 3—3 turned through an angle of 180°, Fig. 4 is a side elevation of Fig. 3 in section on a medial vertical plane with the bottom end broken away showing the nut gear in vertical section mounted on its bearing, Fig. 5 is the same view as is Fig. 2 with fewer parts broken away, Fig. 6 is a cross section of Fig. 1 on the line 6—6, Fig. 7 is a side elevation of an automobile in outline with the upper part of the body broken away showing an end elevation of the jack on one end of the rear axle, retained along side of the axle, and the connecting rod or shaft from the jack to the rear bumper drawn on a smaller scale, Fig. 8 is a rear elevation of the rear wheels and axle of an automobile, segregated, with the two rear jacks in place alongside of the axle drawn on a smaller scale, Fig. 9 is the rear end elevation of Fig. 7, Fig. 10 is a side elevation of the telescoping universal jack-operating shaft, Fig. 11 is the rear end view of Fig. 10, Fig. 12 is a section of Fig. 10 on the line 12—12, Fig. 13 is a cross-section of Fig. 10 on the line 13—13, Fig. 14 is the front end elevation of Fig. 10, and Fig. 15 is a side elevation of the crank for revolving the universal shaft. Fig. 16 is an end view of the crank.

Similar characters refer to similar parts in the several views. Certain parts are broken away to show other parts hidden thereby.

With more particular reference to designated parts: The automobile 15 has rear wheels 16, front wheels 17, front bumper 18, rear bumper 19, rear springs 20, rear axle housing 21 and rear axle 22.

The jack standard 23 has the tapped hole 23ª in one side near the top end and the annular bearing 24 on the said top end. The jack screw nut and beveled gear 25 has an annular recess in its face concentric with its axis which is mounted on the bearing 24 providing for the revolution of gear 25 on this bearing. An axial hole through gear 25 is threaded at 26 to engage the jack screw 27 disposing the screw in the hollow standard 23.

Two clamps consisting of the front parts 31 and rear parts 28 are fastened on the rear axle housing 21 by clamping bolts 31ª. Each of the front parts 28 of these clamps has a rearward extension shaped to provide a chamber having the front wall 29 and the rear wall 30 and the covering wall 30ª.

The outer end of the jack screw 27 has a transverse hole and is disposed in the said chamber between walls 29 and 30. Through aligned holes in walls 30 and 29, preferably at right angles with and in a horizontal plane through the axis of the rear automobile axle 22, is extended the cap screw 32 engaged in wall 29 in which the said hole is tapped for this purpose. The screw 32 also is extended through the said hole in the jack screw 27 with its body disposed in the screw hole to mount the jack screw for oscillation in a vertical plane.

The jack standard 23 has a foot flange 24ª. The jack housing 33 is disposed around the jack standard and has the foot flange 35 superimposed on the flange 24ª and fastened thereto.

In one side of the said jack housing is the hole 36 concentric with the tapped hole 23ª in the jack standard.

The bevel gear 37 has the hub 37ª and a central hole through the hub and gear which varies in shape and size, being round and smallest at the gear end of the hole and square in the hub with an intervening circular part larger than the said end circular part but no larger than the said square part of the hole. The bearing screw 38 is entered through the square part of the said hole and extended through the circular parts thereof having its threaded end engaged in the tapped hole 23ª in the wall 23, thus mounting the bevel gear 37 for revolution on the body of the screw 38 disposed between the jack standard and housing with its hub extended through the housing hole 36 and protruding outside thereof. The relative disposition and dimensions of the bevel gears 25 and 37 provide for their engagement as shown in Figs. 1 and 2.

The square shank 39 is extended in the square hole in the hub of gear 37 and is fastened therein with its outer end protruding outside of the hub.

The aligned holes 41ª and 41ᵇ, respectively in the chamber walls 30 and 29, are disposed diagonally outward and below the cap screw 32 and the hole 41ᵇ is tapped. The upper end of the strut 40 is extended in the chamber between the walls 29 and 30 and has a transverse hole which is aligned with holes 41ª and 41ᵇ. Through the said three aligned holes is extended the cap screw 41, being engaged in tapped hole 41ᵇ with its body mounting the upper end of the strut 40 for oscillation.

The lower end of the strut 40 is forked and has a hole transversely therethrough.

The jack housing cap 34 has a larger and smaller hole through its top and is mounted and fastened on top of the jack housing with the larger hole concentric with the annular gear bearing 24, and the smaller hole is disposed near an edge of the cap. The hub of the gear 25 is extended through the said larger hole in the cap, and the guide rod 42 is extended through the said smaller hole in the cap, in which it is mounted for reciprocation. In the outer surface of the top of cap 34 is the recess 34ª at the outer end of the said smaller hole therein. In the recess 34ª the forked and rounded end of the strut 40 is seated when the jackscrew 27 is not so far extended that the strut does not reach the cap. The flattened end of the rod 42 is inserted in the forked end of the strut 40 and a pin 43 is extended through registering holes in strut and rod to pivotally connect them.

When the jackscrew 27 is extended to dispose the jack housing at its dotted position in Fig. 1 shown at 33″, 34″, the rod 42 extends above the jack housing, which is separated from the strut 40, and when the jackscrew is withdrawn into the housing, the rod 42 guides the forked strut end to the recess 34ª as the housing cap 34 approaches the strut.

On the axle housing 21, between the clamps 28, 31; 28, 31 are two other clamps each consisting of front clamp part 45 and rear clamp part 44 held together on the housing by clamp bolts 46. The rearward clamp part 44, of each of the two clamps, has a U bracket consisting of rearwardly extended arm 47 terminating in catch 47ᵇ having one beveled edge 47ª. From the catch 47ᵇ depend two spaced fingers 48, the inner surfaces of which, as well as the bottom surface of the intervening catch 47ᵇ, are lined with rubber 49 fastened thereto.

The beveled latch 50 has the guide-rod extension 51 and is mounted for reciprocation in latch housing 52 fastened on the jack standard 23. Latch spring 53 is mounted on the guide rod 51 within the housing 52 to react between the housing and the latch 50 tending to extend the latch from the housing. The screw pin 54 is engaged in the latch 50 and extended through the latch-housing slot 55 to limit the extension of the latch 50 outside of its housing. Between an end of the latch housing 52 and the middle part of the jack housing 33 is a slot 33ª in the jack housing wider than the clamp catch 47ᵇ. The clamp catch 47ᵇ is disposed on the axle housing 21 to enter the slot 33ª when the jack swings on the cap screw 32 and the jackscrew is entirely withdrawn disposing the jack in its dotted-line position at 33′ in Fig. 1.

The jack is moved from its solid-line to its dotted-line position at 33′ in Fig. 1 by revolving gear 37 in a clockwise direction causing the retraction of the jackscrew 27 and the upward swing of the jack on the cap screw 32 forced by the strut 40 as it is swung on its cap screw 41. The dimensions and dispositions of the operative parts are, by construction, made to swing the jack to a horizontal position alongside of the axle housing to the left of that shown at 33′ when the jackscrew is revolved clockwise to allow the latch to pass to the left of the catch 47ᵇ and the jack stand 23 enters between the guide fingers 48 compressing the rubber 49 till the latch 50 is higher than the top of the catch 47ᵇ when continued clockwise revolution of the gear 37 moves the jack toward the bearing bracket 29, 30 and engages the latch 50 on top of the catch 47ᵇ. Then a short movement of the gear 37 counter clockwise will remove pressure from the strut 40 and place the weight of the jack on the catch 47ᵇ and the cap screw 32. The jack then is in its portable position with the jack housing at 33′, the jack foot at 24ª′, the jack-housing cap at 34′, the housing groove at 33ª′, the jackscrew at 27′, the gear shank at 39′, the strut at 40′ and the jack latch at 50′. As stated, the jack standard 23 was forced between the cushioned fingers 48 and against the bottom of the cushioned catch 47ᵇ providing for retaining the jack, while not in use and in its portable position, in a noiseless manner. In the event that the upwardly swinging jack latch 50 bears on the catch 47ᵇ, the beveled surface of the latch bears on the beveled surface 47ª of the catch thus retracting the latch against the spring 53 and allowing the jack to move upward till the latch is above the catch and the reaction of the spring may cause the latch to engage the catch.

When it is desired to release the jack from its portable position, the gear 37 is revolved in a counter clockwise direction, extending the jackscrew 27, moving the latch 50 out of contact with the catch 47ᵇ and placing the weight of the horizontally disposed jack on the strut 40. The strut 40 will control the downward swing of the jack by remaining in contact with the housing cap 34 and in the recess 34ª till the continued extension movement of the jackscrew brings the jack to a vertical position below its supporting cap screw 32. By continuing the counter clockwise revolution of the gear 37 the extension of the jackscrew continues and the jack may be moved downward within the limits of the length of the jackscrew, say to its position at 33″, 34″ in Fig. 1. The length of the jack, by construction, disposes the jack base 24ª adjacent the ground when in its dependent position, and the continued extension of the jackscrew, above referred to, causes the jack to bear on the ground beneath the automobile axle and elevate the axle, which is the object for which the mechanism is made and attached to the axle.

In Fig. 8 the rear axle and rear wheels of an automobile are shown with two jacks attached to the axle housing disposed in their portable positions. In Fig. 9 the rear end of an automobile is shown, having the upper part of the body broken away, the two rear jacks in portable positions on the rear axle, and the shaft-bearing brackets 56, 56 fastened to the rear bumper 19.

In Fig. 7 the rear axle is shown in vertical section and the upper end of a jack disposed in portable relation on the axle adjacent the chamber cover wall 30ᵃ. The rear bumper 19 is shown in vertical section with the bearing bracket 56 fastened thereto and extended below the bumper where the shaft bearing 57 is fastened thereon extending forward. A telescoping universal shaft connects the bumper bracket with the jack and is shown in operative position in Fig. 7, but is illustrated by larger scale drawings in Figs. 10–15.

The square socket 74 is engaged with the square shank 39, in the hub of driving gear 37, and fastened thereon with the pin 74. On the outer end of the socket 71 are the U legs 72 of a universal joint pivoted to the gudgeon block 75 by gudgeons 73. Also to the gudgeon block 75 is pivoted the U legs 69, on the shank of the outer telescoping shaft 68, by the gudgeons 70. The outer telescoping shaft 68 is hollow and of rectangular cross section and the inner telescoping shaft 67 is of rectangular cross section and extended into the shaft 68, to drive the same and to reciprocate therein. A shank on the outer end of the shaft 67 has the U legs 65 which are pivoted to the gudgeon block 63 by the gudgeons 66. The outer end of the shaft socket 58 has the U legs 62 which are pivoted to the gudgeon block 63 by the gudgeons 64. The socket 58 has the annular boss 60 thereon and the longitudinal slots 59 diametrically opposite and extended from the rear end of the socket to near the said boss 60. The rear end of the socket 58 is extended into the bracket bearing 57 with the boss 60 bearing on the forward end of the bearing 57. The forward end of the bearing 57 is threaded on its exterior, and the bearing nut 61 is passed over the forward end of the socket 58 to contact with the boss 60 and engage threadwise over the threaded end of the bearing to retain the socket in operative relation with the bracket bearing 57.

The crank shaft 76 has the pin 77 extended through a transverse hole near its end and protruding from both sides thereof. The crank shaft 76 may be extended into the shaft socket 58 with the pin 77 engaged in the slots 59 thus engaging the socket and shaft for cooperative revolution. The crank shaft 76 has the crank 76ᵃ and the crank handle 78.

By inserting the crank shaft 76 into the shaft socket 58 the gear nut 25 may be turned in either direction desired by crank handle 78. That is, by power or force applied to handle 78 either of the jacks attached to the rear axle may be operated either to raise the axle or to lower the same and to dispose the jacks in portable position on the axle by inserting the crank shaft in the desired socket 58.

The path followed by the base of either of the jacks is indicated in Fig. 9 by either of the dotted curves A and the vertical dotted line B as respects the ground C. Here the movement is first longitudinally of the axle to release the jack which then swings downward under control of the crank till it contacts with the ground when continued extension of the jack screw raises the axle which, for convenience, is indicated by changing the position of the ground line C first to either of its dotted positions at C'—C' caused by using either jack alone and then stowing it on the axle before using the other jack, and then, by using the second jack while the first-used jack remains under the axle, the axle is raised at both ends and the position of the ground relative to the wheels is shown in dotted line at C''—C'' when both wheels are held above the ground.

Although this description has been confined to showing the application of my jack improvement to the rear axle of an automobile; it is obvious that, with some modifications of dimensions and design, without change in the essence of the invention, it also may be similarly applied to the front axle of an automobile with bracket bearings similar to those shown at 56, 57 attached to the front bumper. This would provide a like convenient means for raising either of the front wheels and also both of them.

With both axles equipped with my improved jacks, not only could the wheels be raised for infrequent service to the tires but, when leaving the automobile for so short a period as a single night, the four automobile wheels could be so easily and quickly raised from the ground and the rubber thus relieved of the car's weight, that doubtless many automobile owners would follow this as a practice.

In many designs of automobiles the bumpers provide a convenient place to attach the bearing bracket 56. In some designs the fenders or other parts of the car body would be found to be convenient places of attachment for the said shaft terminal.

The telescoping feature of the jack shaft is needed to allow for changing distances between car body and axle during car operation, and the universal joints in this shaft are required because of changes in the relative location of the jack shank 39 during operation.

Having thus disclosed my invention, what I claim as new therein and desire to secure by Letters Patent is,—

1. An automobile jack including, a jackscrew housing, a jackscrew mounted threadwise in the jackscrew housing, means to pivot the outer end of the jackscrew on an automobile axle for oscillation and for raising the said axle by extending the jackscrew from the jackscrew housing, a strut one end thereof being pivoted on the said axle for oscillation and the other end being connected with the jackscrew housing to bear thereon during the latter part of the withdrawal of the jackscrew into the said housing to swing the jack to parallelism with the said axle by completing the withdrawal of the jackscrew into the jackscrew housing, and means to revolve the jackscrew to extend and withdraw the same from and into the jackscrew housing.

2. An automobile jack including, a jackscrew housing, a jackscrew mounted threadwise in the jackscrew housing, means to pivot the outer end of the jackscrew on an automobile axle for oscillation and for raising the said axle by extending the jackscrew from the jackscrew housing, a strut one end thereof being pivoted on the said axle for oscillation and the other end being connected with the jackscrew housing to bear thereon during the latter part of the withdrawal of the jackscrew into the jackscrew housing to swing the jack to parallelism with the said axle, and mechanical connections from an external part of the body of the said automobile to the said jack screw to revolve the jackscrew to extend and